(12) United States Patent
Morrissey

(10) Patent No.: US 7,780,209 B1
(45) Date of Patent: Aug. 24, 2010

(54) PET SCOOP

(76) Inventor: Kay Morrissey, 6220 W. Olympic Blvd., Los Angeles, CA (US) 90048

( * ) Notice: Subject to any disclaimer, the term of this patent is extended or adjusted under 35 U.S.C. 154(b) by 117 days.

(21) Appl. No.: 12/187,117

(22) Filed: Aug. 6, 2008

Related U.S. Application Data

(60) Provisional application No. 60/954,399, filed on Aug. 7, 2007.

(51) Int. Cl.
*A01K 29/00* (2006.01)
(52) U.S. Cl. ...................................................... 294/1.5
(58) Field of Classification Search ........... 294/1.3–1.5; 119/719
See application file for complete search history.

(56) References Cited

U.S. PATENT DOCUMENTS

| 4,021,994 | A | | 5/1977 | Mainprice | |
|---|---|---|---|---|---|
| 4,711,482 | A | * | 12/1987 | Brown et al. | 294/19.1 |
| 5,290,080 | A | * | 3/1994 | Yoshioka | 294/1.5 |
| 6,386,606 | B1 | | 5/2002 | Marshall | |
| 6,925,791 | B2 | | 8/2005 | Herndon | |
| 6,983,966 | B2 | | 1/2006 | Azrikam | |
| 7,232,165 | B2 | * | 6/2007 | Zelon | 294/1.5 |
| 2006/0012195 | A1 | | 1/2006 | Scala | |
| 2006/0214442 | A1 | | 9/2006 | Jones | |
| 2007/0241573 | A1 | * | 10/2007 | Teng | 294/19.1 |
| 2008/0042456 | A1 | | 2/2008 | Patel | |
| 2009/0121505 | A1 | * | 5/2009 | Shatilla | 294/19.1 |

* cited by examiner

*Primary Examiner*—Paul T Chin
(74) *Attorney, Agent, or Firm*—Kenneth L. Tolar

(57) ABSTRACT

A pet scoop includes an elongated tubular shaft having a handle at an upper end and a pivotal, fan-shaped panel at a lower end. A pair of motors move the panel between a raised, contracted orientation and a lowered, expanded orientation. A stack of waste disposal sheets is superimposed on the panel and is secured thereto with removable clamps. Accordingly, the panel may be deployed and expanded beneath a defecating pet to contain and trap the waste for later disposal.

8 Claims, 2 Drawing Sheets

PET SCOOP

CROSS REFERENCE TO RELATED APPLICATIONS

This application is entitled to the benefit of provisional application No. 60/954,399 filed on Aug. 7, 2007, the specification of which is incorporated herein by reference.

BACKGROUND OF THE INVENTION

The present invention relates to a uniquely-designed pet scoop for collecting and discarding pet waste.

DESCRIPTION OF THE PRIOR ART

Dog owners typically walk their dogs in a variety of public places. Inevitably, the dog leaves waste on property belonging to others, which infuriates the owner. To avoid the situation, many dog owners carry plastic bags which are placed over the dog owner's hand and inverted about the waste to encapsulate it for disposal. Disposing of dog waste in such a manner is unpleasant and inconvenient, particular for the elderly or those with physical ailments. As a result, many pet owners will simply ignore the waste, leading to the problems enumerated above. Accordingly, there is currently a need for an easier and more convenient means of collecting and discarding pet waste.

A review of the prior art reveals a myriad of pet waste scoops that are purportedly designed to address this problem. U.S. patent application no. 2008/0042456 filed on behalf of Patel discloses a pickup device for animal waste comprising an elongated handle having a first pair of clamshells at a lower end that are opened and closed with a trigger. Within the first pair of clamshells are a second pair of clamshells that are rotatable by an electric motor to twist a paper bag into a pile.

U.S. patent application no. 2006/0214442 filed on behalf of Jones discloses a sanitary pick-up device comprising an elongated barrel having a pair of bails at one end and a pistol grip at an opposing end. A bag encapsulating the bails is initially expanded by an actuator to collect waste within the bag; the actuator then compresses the bails to close the bag about the collected waste. The barrel includes a storage receptacle for receiving additional bags.

U.S. patent application no. 2006/0012195 filed on behalf of Scala discloses a waste scoop including an elongated rod having a reciprocal collection unit at a lower end thereof.

U.S. Pat. No. 6,983,966 issued to Azrikham discloses an animal waste scoop including a pair of reciprocal jaws.

U.S. Pat. No. 6,925,791 issued to Herndon discloses a hand-operated gatherer for collecting golf balls, nuts or similar objects. The device includes a basket assembly at an end of a shaft that is operated by a trigger at an opposing end.

U.S. Pat. No. 6,386,606 issued to Marshall discloses a pet waste scoop including an elongated shaft having a ring at an end thereof. The ring includes spring-biased clamps for gripping a waste bag.

U.S. Pat. No. 4,021,994 issued to Mainprice discloses a scoop including a folding handle having an open rim secured thereto for supporting a disposable bag.

Though numerous scoops exist in the prior art, none are specifically designed to allow a user to position a collapsible waste disposal bag beneath a defecating pet, and to subsequently collapse the bag about the collected waste for disposal. The present invention provides a pet scoop having a pivotal panel that supports a waste disposal bag. The panel is automatically collapsible to capture any waste deposited onto the bag.

SUMMARY OF THE INVENTION

A pet scoop includes an elongated tubular shaft having a handle at an upper end and a pivotal, fan-shaped panel at a lower end. A pair of motors move the panel between a raised, contracted orientation and a lowered, expanded orientation. A stack of waste disposal sheets is superimposed on the panel and is secured thereto with removable clamps. Accordingly, the panel may be deployed and expanded beneath a defecating pet to contain and trap the waste for later disposal.

It is therefore an object of the present invention to provide a pet scoop that eliminates the undesirable task of removing pet waste with a hand-held plastic bag.

It is another object of the present invention to provide a pet scoop that assists pet owners with collecting and discarding pet waste.

Other objects, features, and advantages of the present invention will become readily apparent from the following detailed description of the preferred embodiment when considered with the attached drawings and the appended claims.

DESCRIPTION OF THE PREFERRED EMBODIMENT

Figures 1, 2:
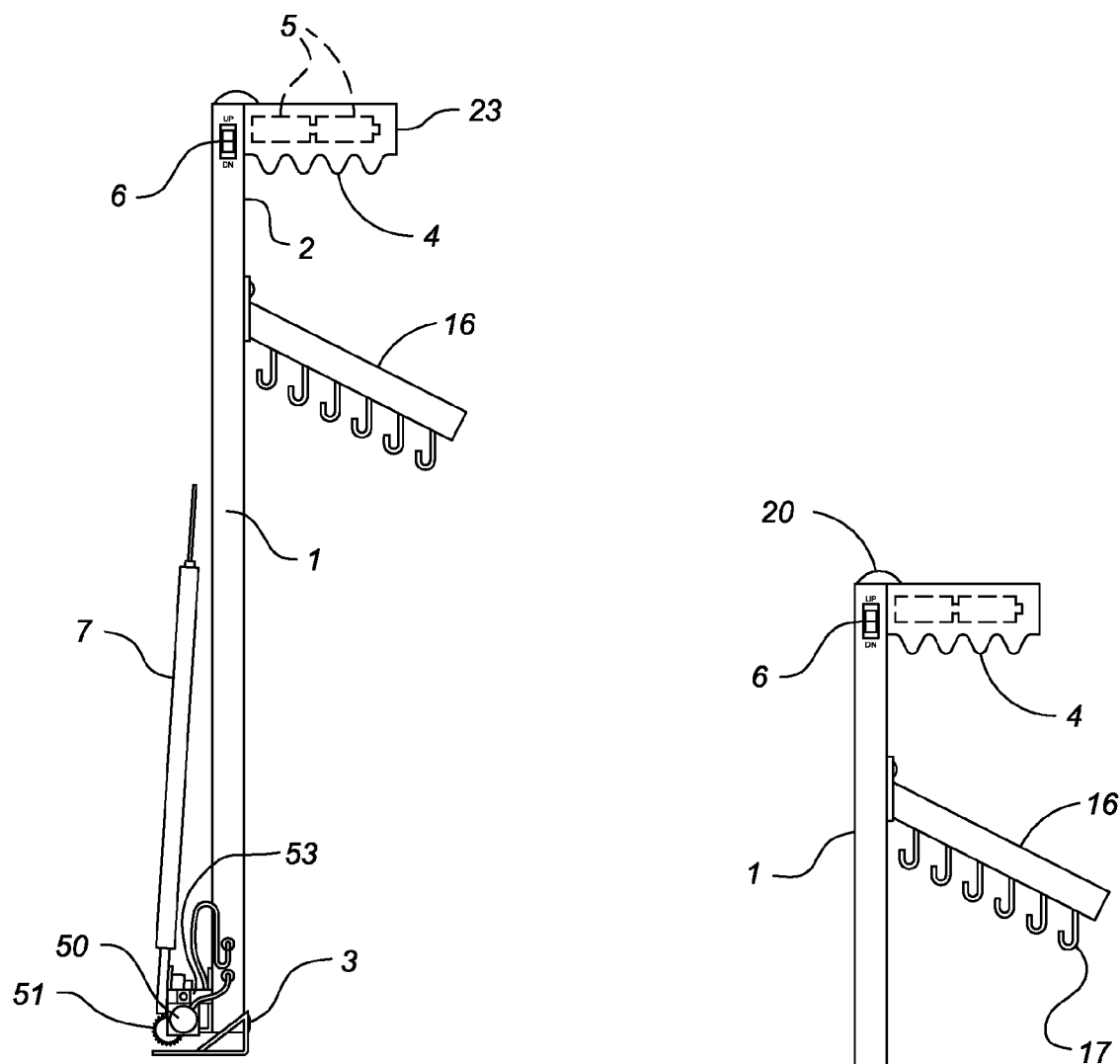
FIG. 1 is a side, plan view of the scoop according to the present invention with the panel in a raised, collapsed orientation.
FIG. 2 depicts the scoop of FIG. 1 with the panel in a lowered, expanded orientation.
Figure 3:
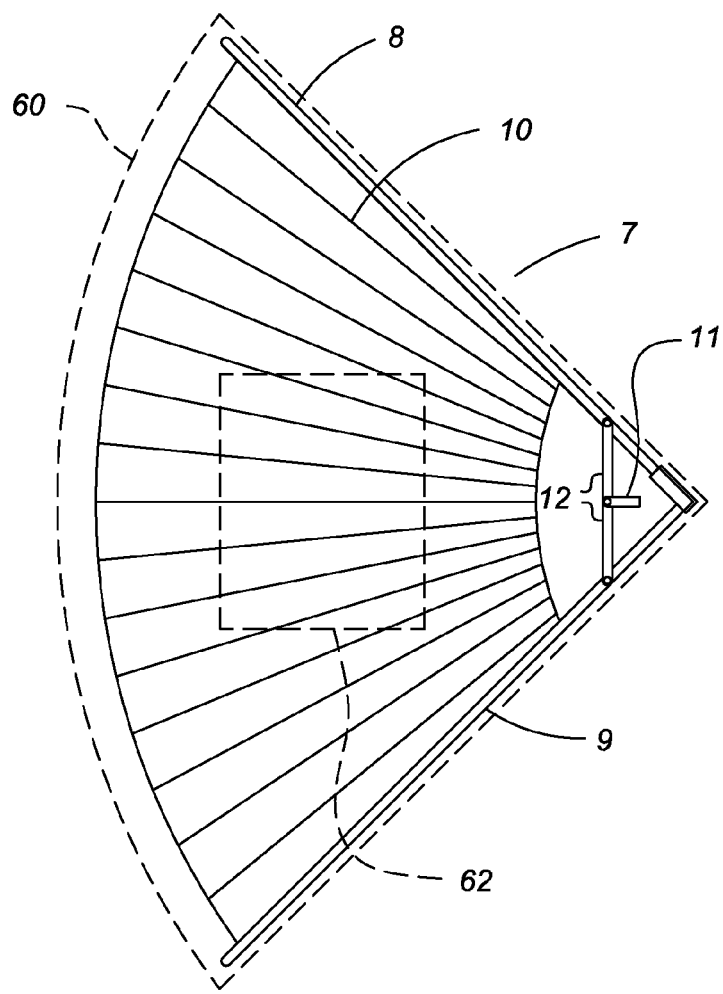
FIG. 3 is a top view of the panel in an expanded orientation depicting a waste-disposal sheet in phantom.
Figure 4:
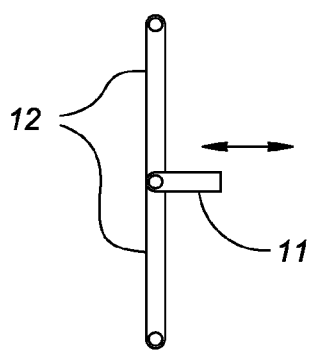
FIG. 4 depicts the link members and actuator arm in an extended position.
Figure 5:
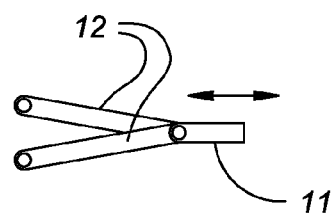
FIG. 5 depicts the link members and actuator arm in a retracted position.
Figure 6:
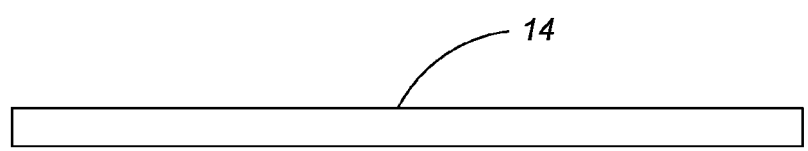
FIG. 6 is a side view of an exemplary waste-disposal sheet clamps.

The present invention relates to a pet scoop comprising an elongated tubular shaft 1 having an upper end 2 and a lower end 3. Perpendicularly extending from the upper end is a handle 23 having finger indentions 4 formed thereon. Housed within the handle are batteries 5 that operate a pair of internally-disposed, reversible DC motors 53, 54. A pair of switches 6 adjacent the handle are each movable between one of three positions to operate a corresponding motor in either of three states: a first direction, a second direction and stop.

Pivotally secured to the lower end of the shaft is an expandable scoop member 7 for collecting and retaining waste. The scoop member includes a collapsible, fan-shaped panel 8 formed of a pair of spaced tapering side ribs 9 with a pleated, collapsible sheet 10 therebetween. A gear 50 driven by one of the motors 53 engages a gear 51 on an end of one of the ribs whereby operation of the motor raises and lowers the scoop member.

A link member 11, having a pair of actuator arms 12 pivotally attached to a distal end thereof, is operably connected to a second DC motor 54. The end of each actuator arm opposite the link member is pivotally secured to one of the ribs. Accordingly, rotation of the second motor in a first direction retracts the link member and actuator arms thereby causing the panel to collapse. Reversing the motor extends the link member causing the actuator arms and ribs to diverge thereby expanding the panel.

A stack of waste disposal sheets is superimposed on the panel. Each sheet 60 has a substantially identical size, configuration and shape as the underlying panel. A clamp 14 simultaneously slides over an outer edge of the sheets and an underlying panel rib to retain the sheets on the panel. Each sheet includes a pocket 62 formed on its upper surface for receiving and encapsulating waste.

Extending from an intermediate portion of the shaft is a rack 16 including a plurality of removable, J-shaped hook members 17 to which filled, waste-disposal sheets may be suspended prior to disposal. A clicker 20 on an upper end of the shaft, adjacent the handle, may be actuated to emit a congratulatory sound when the dog relieves in an appropriate location.

To collect and discard waste, a user actuates the first motor switch to deploy the panel from a raised, vertical position to a lowered, horizontal position. The user then actuates the second motor switch to expand the panel; the expanded panel is positioned beneath the pet as it is relieving so that any generated waste lands on the uppermost sheet at which time the panel is returned to the vertical position. Immediately thereafter, the fan-shaped panel is automatically collapsed thereby entrapping the waste within the sheet pocket. The uppermost sheet may then be removed from the panel and suspended from one of the J-shaped hook members on the storage rack until it can be permanently discarded.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A pet scoop comprising:
an elongated shaft having an upper end and a lower end;
an expandable scoop member pivotally secured to the lower end of the shaft;
means for automatically expanding and collapsing said scoop member;
means for automatically pivoting said scoop member between a raised, vertical position, and a lowered, horizontal position.

2. The pet scoop according to claim 1 wherein said scoop member includes a collapsible, fan-shaped panel formed of a pair of spaced side ribs with a pleated, collapsible sheet therebetween.

3. The pet scoop according to claim 2 wherein said means for expanding and collapsing said scoop member comprises:
a pair of actuator arms, one of said actuator arms pivotally attached to one of said ribs, another of said actuator arms pivotally attached to another of said ribs;
a link member pivotally attached to said actuator arms;
a motor means operably connected to said link member for moving said link member in either of two opposite directions whereby movement of the link member in one of said directions collapses the actuator arms causing the panel to collapse, and movement of the link member in another of said directions causes the actuator arms to diverge thereby expanding the panel.

4. The pet scoop according to claim 1 wherein said means for automatically pivoting said scoop member between a raised, vertical position, and a lowered, horizontal position comprises:
a motor means operatively connected one of said ribs for moving said scoop member between a horizontal and a vertical position.

5. The pet scoop according to claim 1 further comprising:
a stack of waste disposal sheets secured to an upper surface of said panel, each of said sheets including a pocket formed thereon for receiving and encapsulating waste.

6. The pet scoop according to claim 5 further comprising:
a rack extending from an intermediate portion of the shaft, said rack including a plurality of removable, J-shaped hook members to which filled waste-disposal sheets are suspended prior to disposal.

7. The pet scoop according to claim 1 further comprising a clicker on the upper end of the shaft, adjacent the handle, for emitting a congratulatory sound when a pet relieves in an appropriate location.

8. The pet scoop according to claim 1 further comprising a handle perpendicularly extending from the upper end of said shaft, said handle having finger indentions formed thereon.

* * * * *